J. J. TRAKIMAS.
CUTTER HEAD FOR ROCK DRILLING MACHINES.
APPLICATION FILED JULY 10, 1918.

1,290,412.

Patented Jan. 7, 1919.

UNITED STATES PATENT OFFICE.

JACOB J. TRAKIMAS, OF WATERTOWN, NEW YORK.

CUTTER-HEAD FOR ROCK-DRILLING MACHINES.

1,290,412.　　　　　Specification of Letters Patent.　　Patented Jan. 7, 1919.

Application filed July 10, 1918. Serial No. 244,206.

*To all whom it may concern:*

Be it known that I, JACOB J. TRAKIMAS, a citizen of the United States, residing at Watertown, in the county of Jefferson and State of New York, have invented certain new and useful Improvements in Cutter-Heads for Rock-Drilling Machines, of which the following is a specification, reference being had to the accompanying drawings.

This invention relates to drilling machines used in mining operations and under like circumstances for drilling coal and rock, and particularly to a cutter head designed to be connected to the drill and so formed that the knives or cutters of the cutter head may be readily removed and replaced, thus permitting various forms of knives to be used and permitting the knives to be readily sharpened whenever necessary.

A further object is to provide a construction of this character comprising a body having a central socket for a drill bit, the body being split or slitted tangentially at a plurality of points so as to provide a plurality of yieldable clamping jaws between which the knives or cutters are disposed and provide means whereby these jaws may be urged into clamping engagement with the knives.

A further object is to provide a cutter head of this character with a plurality of knives and jaws holding the knives in place and provide a tapered sleeve engaging over the head and the knives, the sleeve being adjustable on the head to tighten the knives in place.

Other objects will appear in the course of the following description.

My invention is illustrated in the accompanying drawings, wherein:—

Figure 1 is a side elevation with parts broken away of a rock drill constructed in accordance with my invention;

Fig. 2 is a side elevation of the cutter supporting head with the cutters and outer sleeve removed;

Fig. 3 is a front elevation of the cutter supporting head;

Fig. 4 is a perspective view of one of the cutters; and

Fig. 5 is an elevation of the central drill.

Referring to these figures, it will be seen that this cutter head comprises a body 10, and a shank which is formed with a circular or cylindrical portion 11 adjacent the body and with a square tapered portion 12, having a notch 13 on one face. This tapered shank 12 is adapted to be inserted within the spindle or drill shaft 14 of a mining drill, and held in place therein in any suitable manner.

The body 10 has a central bore or socket 15 for the reception of the shank of a drill 16 and this body is slitted to provide a plurality of jaws 17. These jaws extend in a helical relation to the central axis of the body and each jaw 17 is relatively flattened on one face as at 18 and is rabbeted on the other face as at 19 to form a seat for a cutting knife. The jaws are connected to the body at their upper ends and formed integral therewith but are separated from each other for the greater portion of their length by spirally disposed slots 20 which slots intersect the bore 15 at the lower ends of the jaws on a line tangential to the bore, as shown clearly in Fig. 3. Because the lower portions of the jaws are separated from each other by means of these slots 20, it is obvious that the jaws may be forced together so as to bind on the centrally disposed drill 16 and to bind upon the cutters or blades disposed between the jaws. The lower end of each jaw is beveled downward and centrally toward the point of the jaw as at 21. The outer face of the body 10 and the outer faces of the jaws are tapered upward, the greatest diameter of the body being on the line *a—a*.

The central drill 16 is a twist drill and has a shank 22 which fits the bore 15. Each of the cutters 23 has a slight twist from end to end so that it will fit in the space between two of the jaws 17 and has a length somewhat greater than the length of the body so that when the cutter is in place the outer edge face of the cutter is flush with the outer face of the jaws. The outer face of the body and of the jaws is screw-threaded as at 24.

For the purpose of holding the cutters in place and causing the jaws to clamp upon the cutters, I provide the somewhat tapering clamping collar 25 interiorly screw-threaded for engagement with the screw-threads 24. When this collar is in place and turned down it wedges the jaws inward and therefore wedges the jaws into clamping engagement with the cutters and with the central drill. Preferably the upper end of the collar is formed with notches 26 whereby a wrench may be applied to the collar and the collar screwed into place. Preferably the exterior face of the body 10 and the exterior face of the collar are formed with left hand screw-threads which causes this collar or sleeve 25 to bind or screw down upon the knives and drill body when the drill is rotated in its operation.

In order to prevent the knives 23 from moving rearward and becoming unscrewed from their clamped position, I provide a second collar 27 which surrounds the rounded portion 11 of the shank and is held in place thereon by set screws 29. Preferably the clamping collar or sleeve 25 is formed upon its exterior face with a plurality of spiral or helical grooves 28 whereby the coal or rock dust may escape. The spiral flanges 30 are also arranged upon the drill shaft 14 for the same purpose. In order to hold the central drill 16 in place, I may provide a set screw 31 which passes through the body 10 as illustrated in Fig. 2, and engages the drill 16.

I have illustrated a drill with six knives but it will, of course, be obvious that the body of the drill might be made to accommodate a greater or less number and further that less than six knives may be used, if desired, on a drill having grooves to accommodate six knives. These knives are made of high speed steel as is the drill body itself and the knives can be adjusted so as to drill any desired character of hole. The drill and the knives or cutters are all held in place by one band. The holder or head is designed to fit any mining machine and thus it is not necessary to change machines in order to drill different kinds of drill holes. It will be obvious that this drill is very simple, that it may be readily kept in good condition, and that it will increase production.

What I claim is:—

1 In a drill head, a body having a central bore, the body for a portion of its length being longitudinally slit to define a plurality of jaws, each of said jaws being grooved on one face, cutting knives disposed in said grooves, and means detachably disposed around the body for locking said cutting knives in place and forcing the jaws toward the axial center of said head and toward each other, to thereby clamp the cutting knives in place.

2. A drill head of the character described comprising a body having a shank, the body having a central socket and being longitudinally slitted at a plurality of points to form a plurality of radially disposed jaws surrounding the central socket, each of said jaws being grooved on one face to receive the cutter, the said slits and the grooves extending helically with relation to the axis of the head, knives disposed in said grooves, and an adjustable collar surrounding the body and urging said jaws toward the axial center of the body to thereby hold the knives in clamped engagement.

3. A drill head of the character described comprising a body having a shank, the body being upwardly tapered and having a central bore and being formed with a plurality of helically extending slits intersecting said central bore to provide a plurality of helically arranged jaws, each jaw being grooved upon one face to receive a cutter, the exterior of the body being screw-threaded, knives disposed in said grooves, and an interiorly screw-threaded tapered collar adapted to engage the body and urge the jaws toward the axial center of the body and into clamping engagement with the cutters.

4. A drill head of the character described comprising a body having a shank, the body being upwardly tapered and having a central bore and being formed with a plurality of helically extending slits intersecting said central bore to provide a plurality of helically arranged jaws, each jaw being grooved upon one face to receive a cutter, the exterior of the body being screw-threaded, knives disposed in said grooves, an interiorly screw-threaded tapered collar adapted to engage the body and urge the jaws toward the axial center of the body and into clamping engagement with the cutters, and a collar embracing the shank and abutting against the ends of the knives and holding the knives in place against longitudinal movement.

5. A drill of the character described comprising an upwardly tapered body, a shank, the body having an upwardly extending socket at its lower end for the reception of a central drill and being formed with a plurality of helically extending slits intersecting the lower end of the bore at a tangent thereto, the slits defining a plurality of jaws, each of said jaws extending helically and being formed with a longitudinally extending groove in one face to receive a cutter, cutters disposed in said groove, a drill having a shank disposed in the socket, and an upwardly tapering clamping collar having screw-threaded engagement with the upper face of the body and adapted to force the jaws toward the axial center of the body to thereby clamp the drill and said cutters in place.

In testimony whereof I hereunto affix my signature in the presence of two witnesses.

JACOB J. TRAKIMAS.

Witnesses:
 GLENN W. DICKSON,
 VERN W. BILLIN.